United States Patent

Rathinasamy et al.

(10) Patent No.: US 11,314,302 B2
(45) Date of Patent: Apr. 26, 2022

(54) POWER/DATA TRANSMISSION BREAKOUT SYSTEM

(71) Applicant: Dell Products L.P., Round Rock, TX (US)

(72) Inventors: Shree Rathinasamy, Round Rock, TX (US); Neal Beard, Austin, TX (US); Victor Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/987,617

(22) Filed: Aug. 7, 2020

(65) Prior Publication Data

US 2022/0043497 A1 Feb. 10, 2022

(51) Int. Cl.
*G06F 1/26* (2006.01)
*G06F 1/28* (2006.01)

(52) U.S. Cl.
CPC .............. *G06F 1/266* (2013.01); *G06F 1/28* (2013.01)

(58) Field of Classification Search
CPC ............. G06F 1/266; G06F 1/28; H04L 12/10
See application file for complete search history.

(56) References Cited

U.S. PATENT DOCUMENTS

| 2011/0026525 A1* | 2/2011 | He | H04L 49/351 370/392 |
|---|---|---|---|
| 2018/0219635 A1* | 8/2018 | Sipes, Jr. | H04L 12/6418 |
| 2019/0182056 A1* | 6/2019 | Ramanujam | G06F 1/32 |
| 2019/0199536 A1* | 6/2019 | Kurk | H04L 12/10 |

OTHER PUBLICATIONS

Versa Technology, VX-Pi1000SP Gigabit PoE Splitter, 2 pages, https://www.versatek.com/product/vx-pi1000sp-gigabit-poe-splitter/, Printed: Aug. 6, 2020.

* cited by examiner

*Primary Examiner* — Albert Wang
(74) *Attorney, Agent, or Firm* — Joseph Mencher

(57) ABSTRACT

A power/data transmission breakout system includes a power/data transmission breakout device coupled to a powering device and each of a plurality of powered devices. The power/data transmission breakout device receives power and data from the powering device via a first power/data cable that is connected to the power/data transmission breakout device, and identifies a first powered device as a destination for the data. The power/data transmission breakout device then transmits a respective subset of the power that was received from the powering device via each of a plurality of second power/data cables that are each connected to the power/data transmission breakout device and a respective one of the plurality of powered devices, and transmits the data along with the respective subset of the power that was received from the powering device via the second power/data cable that is connected to that first powered device.

20 Claims, 14 Drawing Sheets

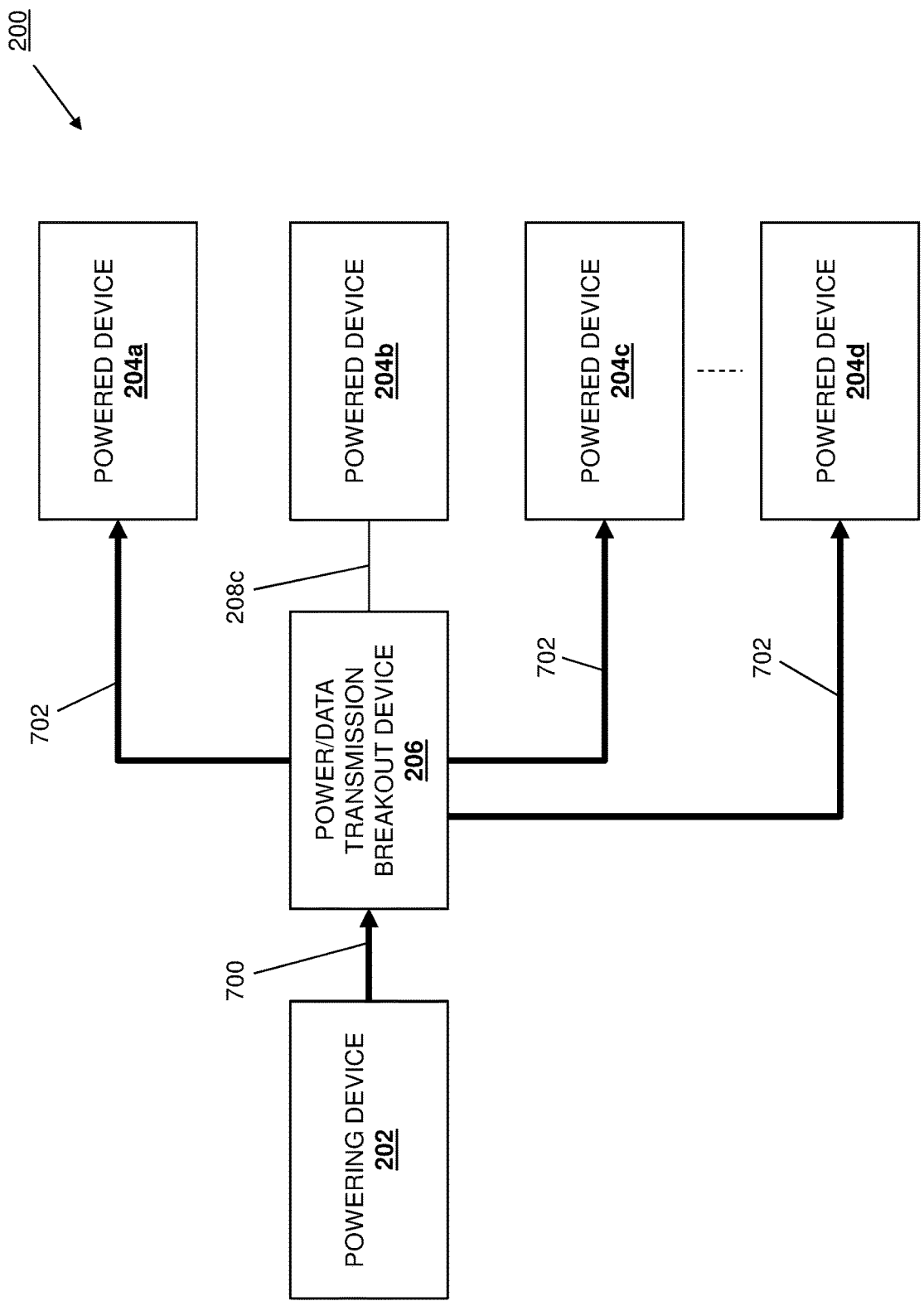

POWER/DATA TRANSMISSION BREAKOUT SYSTEM

BACKGROUND

The present disclosure relates generally to information handling systems, and more particularly to providing a power/data transmission received via a single cable to multiple information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is often desirable to transmit power and data between information handling systems via a single cable in order to, for example, reduce the amount of cabling required to enable information handling systems functionality. For example, powering devices (also called Power Source Equipment (PSE)) may be provided by powering switch devices that are configured to transmit data and power over a single cable connected to a Powered Device (PD) that may be provided by a camera, an access point, and/or other powered devices known in the art. In a specific example, the transmission of data and power over a single cable may be enabled using Power over Ethernet (PoE) techniques that transmit data over a first subset of wires in an Ethernet cable, and transmit power over a second subset of wires in that Ethernet cable. However, conventional single-cable data and power transmission techniques require a respective cable to be provided between the powering device and each powered device. As such, in situations where a relatively large number of powered devices are utilized, a relatively large number of cables are required, and additional powering devices may also be required in order to support the transmission of data and power to those powered devices.

Accordingly, it would be desirable to provide power/data transmission breakout system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a power/data transmission breakout engine that is configured to: receive, from a powering device, power and data via a first power/data cable that is coupled to the processing system; identify a first powered device that is included in a plurality of powered devices as a destination for the data that was received from the first powering device; transmit a respective subset of the power that was received from the powering device via each of a plurality of second power/data cables that are each coupled to the processing system and a respective one of the plurality of powered devices; and transmit the data that was received from the first powering device along with the respective subset of the power that was received form the powering device via the second power/data cable that is connected to the first powered device.

BRIEF DESCRIPTION OF THE DRAWINGS

FIG. 7D is a schematic view illustrating an embodiment of the power/data transmission breakout system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
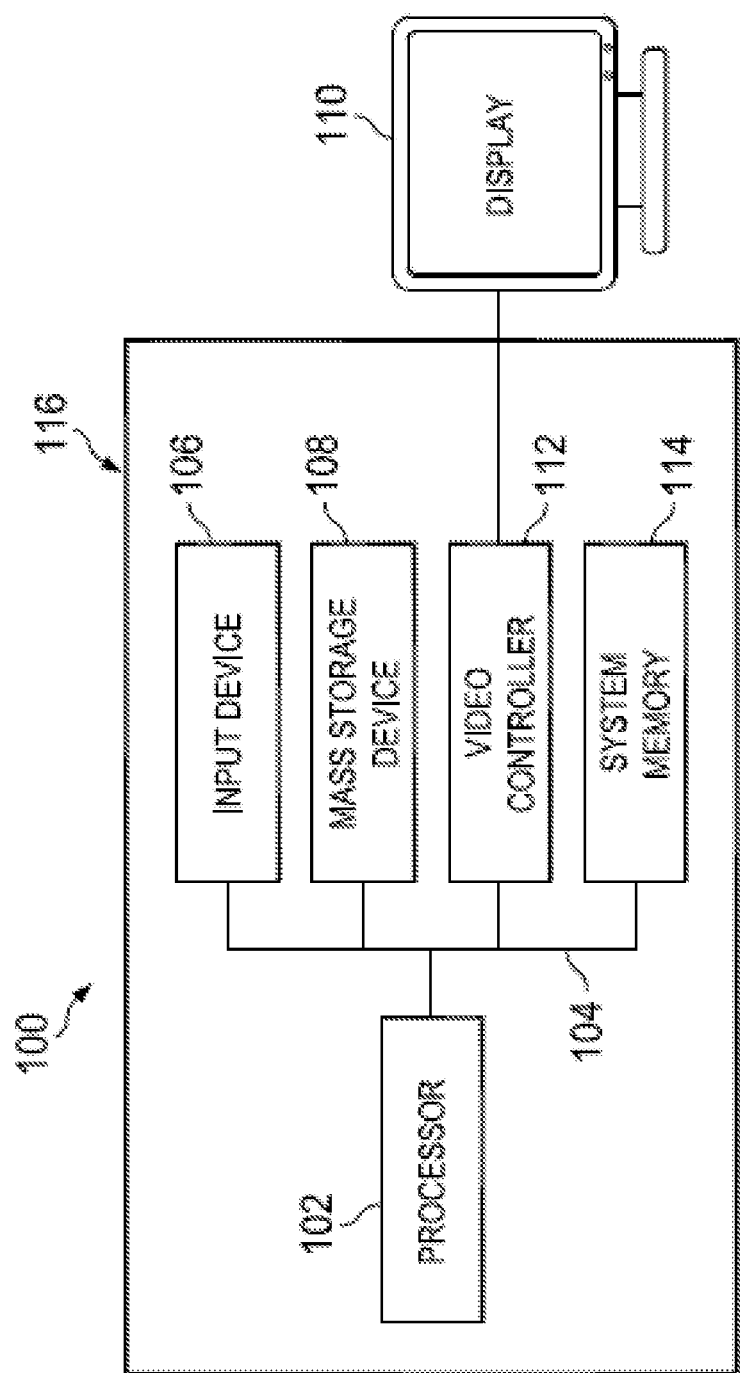
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
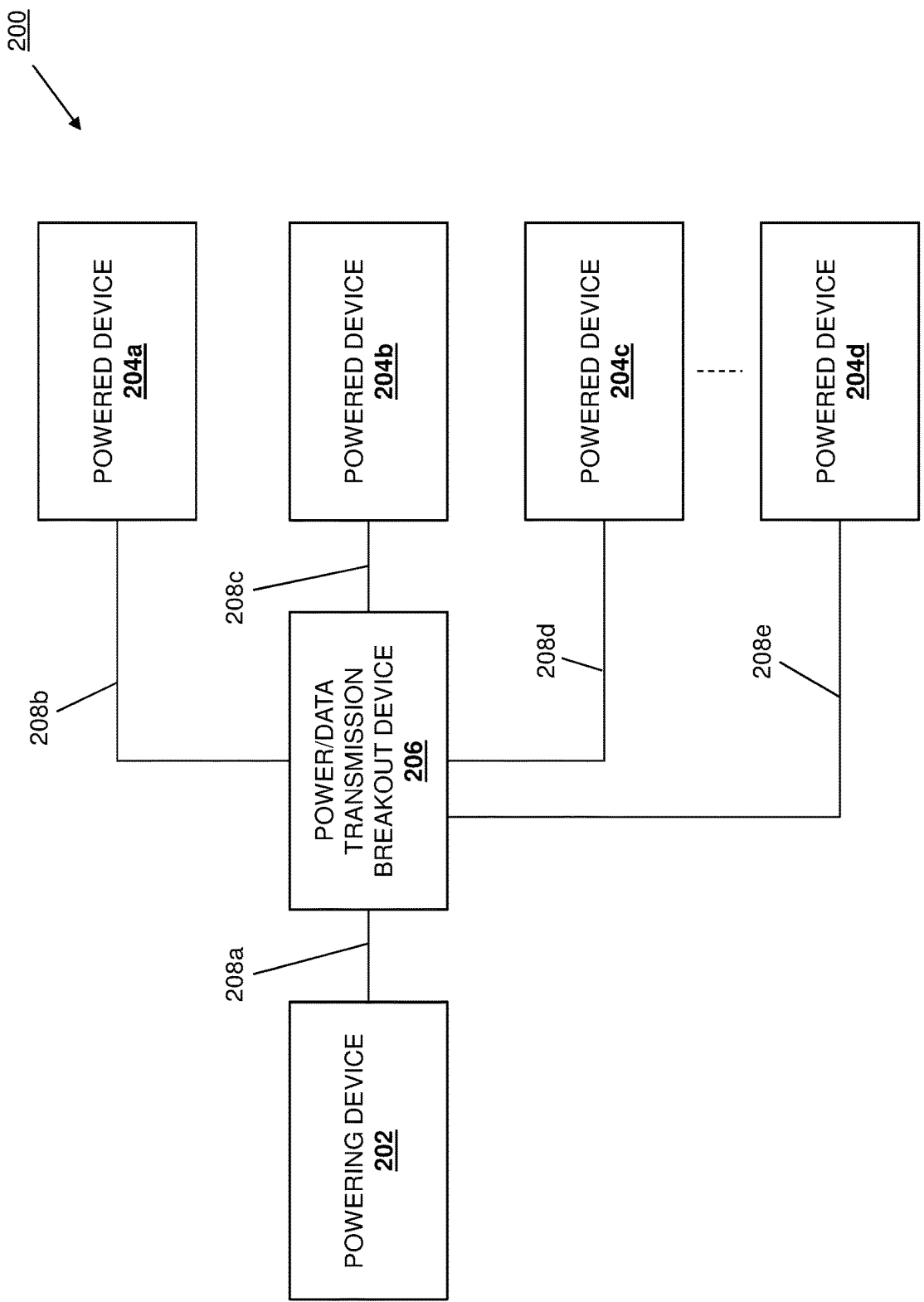
FIG. 2 is a schematic view illustrating an embodiment of a power/data transmission breakout system.

Referring now to FIG. 2, an embodiment of a power/data transmission breakout system 200 is illustrated. In the illustrated embodiment, the power/data transmission breakout system 200 includes a powering device 202. In an embodiment, the powering device 202 may be provided by the IHS 100 discussed above with reference to FIG. 1, and/or may include some or all of the components of the IHS 100, and in specific examples may be provided by a switch device or other networking device that is configured to transmit/receive data and transmit power to a powered device via one or more of its ports and over a single cable connected to each of that port and the powered device. As discussed above, powering devices provided according to the teachings of the present disclosure may be provided by Power over Ethernet (PoE) switch devices, switch devices configured to transmit/receive data and transmit power using hybrid fiber/copper cabling described by the inventors of the present disclosure in U.S. patent application Ser. No. 15/929,605, filed on May 12, 2020; U.S. patent application Ser. No. 15/929,654, filed on May 14, 2020; and U.S. patent application Ser. No. 16/900,967, filed on Jun. 14, 2020; the disclosures of which are incorporated by reference in their entirety, and/or other powering switch devices that would be apparent to one of skill in the art in possession of the present disclosure. However, while illustrated and discussed as being provided by switch device(s), one of skill in the art in possession of the present disclosure will recognize that powering devices provided in the power/data transmission breakout system 200 may include any devices that may be configured to operate similarly as the powering device 202 discussed below.

In the illustrated embodiment, the power/data transmission breakout system 200 also includes a plurality of powered devices 204a, 204b, 204c, and up to 204d. In an embodiment, the powering devices 204a-204d may be provided by the IHS 100 discussed above with reference to FIG. 1, and/or may include some or all of the components of the IHS 100, and in specific examples may be provided by cameras, networking access points, phones, and/or any other computing devices that one of skill in the art in possession of the present disclosure would recognize as being configured to transmit/receive data and receive power from a powering device via one of its ports and over a single cable connected to that port and the powered device. As discussed above, powered computing devices provided according to the teachings of the present disclosure may be provided by Power over Ethernet (PoE) computing devices, powered computing devices configured to transmit/receive data and receive power using hybrid fiber/copper cabling described by the inventors of the present disclosure in U.S. patent application Ser. No. 15/929,605, filed on May 12, 2020; U.S. patent application Ser. No. 15/929,654, filed on May 14, 2020; and U.S. patent application Ser. No. 16/900,967, filed on Jun. 14, 2020; the disclosures of which are incorporated by reference in their entirety, and/or other powered computing devices that would be apparent to one of skill in the art in possession of the present disclosure. However, while illustrated and discussed as being provided by particular computing devices, one of skill in the art in possession of the present disclosure will recognize that powered devices provided in the power/data transmission breakout system 200 may include any devices that may be configured to operate similarly as the powered devices 204d-204d discussed below.

As illustrated in FIG. 2, each the powered devices 204a-204d may be coupled to the powering device 202 via a power/data transmission breakout device 206 that is provided according to the teachings of the present disclosure, as well sets of power/data cables that may be provided by, for example, Ethernet cables, hybrid fiber/copper cables described by the inventors of the present disclosure in U.S. patent application Ser. No. 15/929,605, filed on May 12, 2020; U.S. patent application Ser. No. 15/929,654, filed on May 14, 2020; and U.S. patent application Ser. No. 16/900, 967, filed on Jun. 14, 2020; the disclosures of which are incorporated by reference in their entirety, and/or any other power/data cable that would be apparent to one of skill in the art in possession of the present disclosure. For example, the power/data transmission breakout device 206 is illustrated as being connected to the powering device 202 by a power/data cable 208a, with the powered device 204a connected to the power/data transmission breakout device 206 by a power/data cable 208b, the powered device 204b connected to the power/data transmission breakout device 206 by a power/data cable 208c, the powered device 204c connected to the power/data transmission breakout device 206 by a power/data cable 208d, and the powered device 20da connected to the power/data transmission breakout device 206 by a power/data cable 208e.

As discussed below, each of the powered devices 204*a*-204*d* in the examples below may receive power and data via the power/data transmission breakout device 206 and sets of power/data cables that couple that powered device to the powering device 202, with the power/data transmission breakout device 206 configured to manage the receiving of power and data from the powering device 202 and the distribution of that power and data to the powered devices 204*a*-204*d*. As such, power/data transmission breakout devices of the present disclosure allow for a single power/data cable connection to a single power/data connector on a powering device to be utilized in the provisioning of power and data to multiple powered devices, thus allowing the powering device to provide power and data to many more powered devices, and reducing the amount of power/data cabling required to do so. However, while a specific power/data transmission breakout system 200 has been illustrated and described, one of skill in the art in possession of the present disclosure will recognize that the power/data transmission breakout system of the present disclosure may include a variety of components and component configurations while remaining within the scope of the present disclosure as well.

Figure 3:
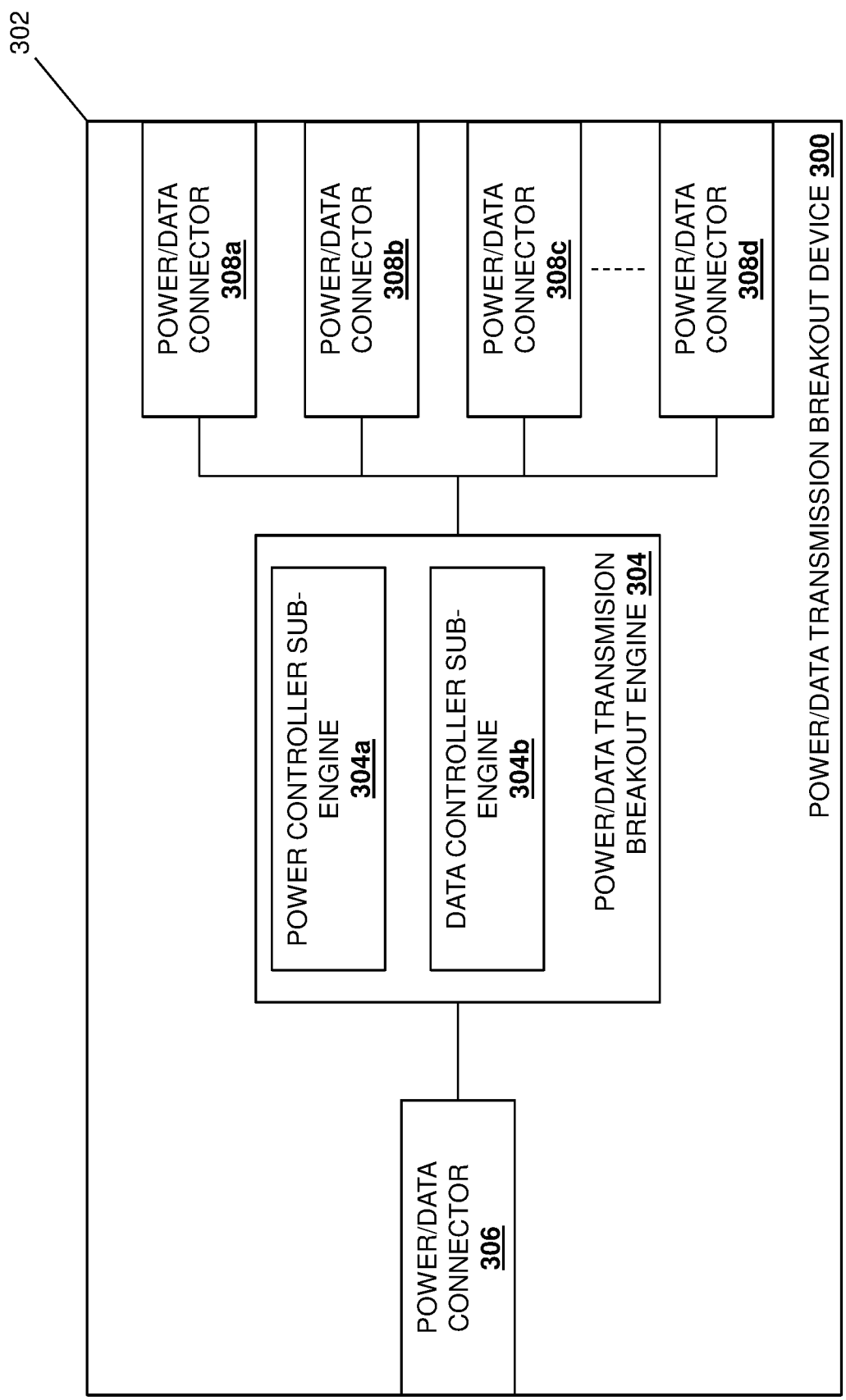
FIG. 3 is a schematic view illustrating an embodiment of a power/data transmission breakout device that may be included in the power/data transmission breakout system of FIG. 2.

Referring now to FIG. 3, an embodiment of a power/data transmission breakout device 300 is illustrated that may provide the power/data transmission breakout device 206 discussed above with reference to FIG. 2. In some embodiments, the power/data transmission breakout device 300 may be provided by the IHS 100 discussed above with reference to FIG. 1 and/or may include some or all of the components of the IHS 100. In the illustrated embodiment, the power/data transmission breakout device 300 includes a chassis 302 that houses the components of the power/data transmission breakout device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a power/data transmission breakout engine 304 that is configured to perform the functionality of the power/data transmission breakout engines and/or power/data transmission breakout devices discussed below.

In the examples provided below, the power/data transmission breakout engine 304 may be provided by a power controller sub-engine 304*a* that is configured to perform the power functionality of the power/data transmission breakout device 300, and a data controller sub-engine 304*b* that is configured to perform the data functionality of the power/data transmission breakout device 300. In some embodiments, the power controller sub-engine 304*a* described in the examples below may be provided by a breakout controller that may be included in the processing system and/or memory system in the chassis 302, while the data controller sub-engine 304*b* described in the examples below may be provided by an Layer 2 Application Specific Integrated Circuit (ASIC) that may be included in the processing system and/or memory system in the chassis 302. However, while particular components are illustrated and described as performing the functionality of the power/data transmission breakout engine 304 and/or power/data transmission breakout device 300, one of skill in the art in possession of the present disclosure will recognize that the functionality of the power/data transmission breakout device 300 may be provided by a variety of components and/or in a variety of manners that will fall within the scope of the present disclosure as well.

The chassis 302 may also house a communication system that is illustrated in FIG. 3 as being provided by a power/data connector 306 that may connect to the powering device 202 via the power/data cable 208*a* discussed above with reference to FIG. 2, and a plurality of power/data connectors 308*a*, 308*b*, 308*c*, and up to 308*d*, each of which is coupled to a respective one of the powered devices 204*a*, 204*b*, 204*c*, and up to 204*d* via the respective power/data cables 208*b*, 208*c*, 208*d*, and up to 208*e* discussed above with reference to FIG. 2. As discussed below, the power/data connector 306 is configured to receive power (along with data) from a powering device and, in many embodiments, the power/data transmission breakout device 300 may not include any other power system or power source (e.g., a separate power system and/or connection to another power source such as an AC wall outlet) other than the powering device connected to the power/data connector 306. While not illustrated in FIG. 3, one of skill in the art in possession of the present disclosure will appreciate how each of the power/data connectors 306 and 308*a*-308*d* may include link indicators, activity indicators, and/or other indicators (e.g., Light Emitting Devices (LEDs)) that are configured to indicate the data and/or power transmitted via that power/data connector. However, while a specific power/data transmission breakout device 300 has been illustrated, one of skill in the art in possession of the present disclosure will recognize that power/data transmission breakout devices (or other devices operating according to the teachings of the present disclosure in a manner similar to that described below for the power/data transmission breakout device 300) may include a variety of components and/or component configurations for providing conventional functionality, as well as the functionality discussed below, while remaining within the scope of the present disclosure as well.

Figure 4:
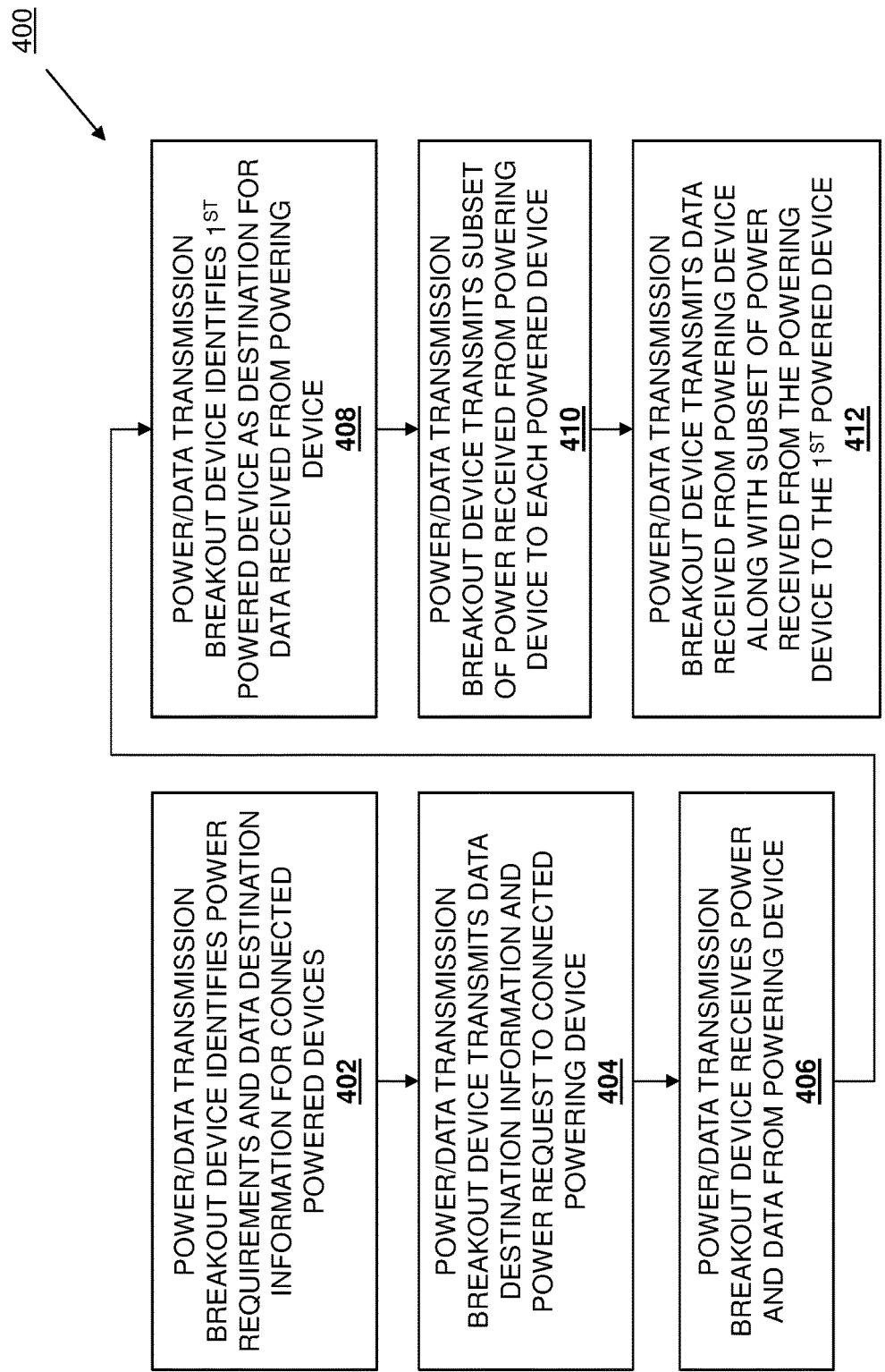
FIG. 4 is a flow chart illustrating an embodiment of a method for transmitting power and data.

Referring now to FIG. 4, an embodiment of a method 400 for transmitting power and data is illustrated. As discussed below, the 333 systems and methods of the present disclosure provide for the distribution of power and data, which are received via a single power/data cable from the powering device, to a plurality of different powered devices. For example, the power/data transmission breakout system includes a power/data transmission breakout device that is coupled to a powering device and each of a plurality of powered devices, with the power/data transmission breakout device receiving power and data from the powering device via a first power/data cable that is connected to the power/data transmission breakout device, and identifying a first powered device that is included in the plurality of powered devices as a destination for the data that was received from the powering device. The power/data transmission breakout device then transmits a respective subset of the power that was received from the powering device via each of a plurality of second power/data cables that are each connected to the power/data transmission breakout device and a respective one of the plurality of powered devices, and transmits the data that was received from the powering device along with the respective subset of the power that was received from the powering device via the second power/data cable that is connected to the first powered device. As such, a single power/data cable connection to a single power/data connector on a powering device to be utilized in the provisioning of power and data to multiple powered devices, thus allowing the powering device to provide power and data to many more powered devices relative to conventional single-cable power/data transmission systems, and reducing the amount of power/data cabling required to do so.

Figure 5A:
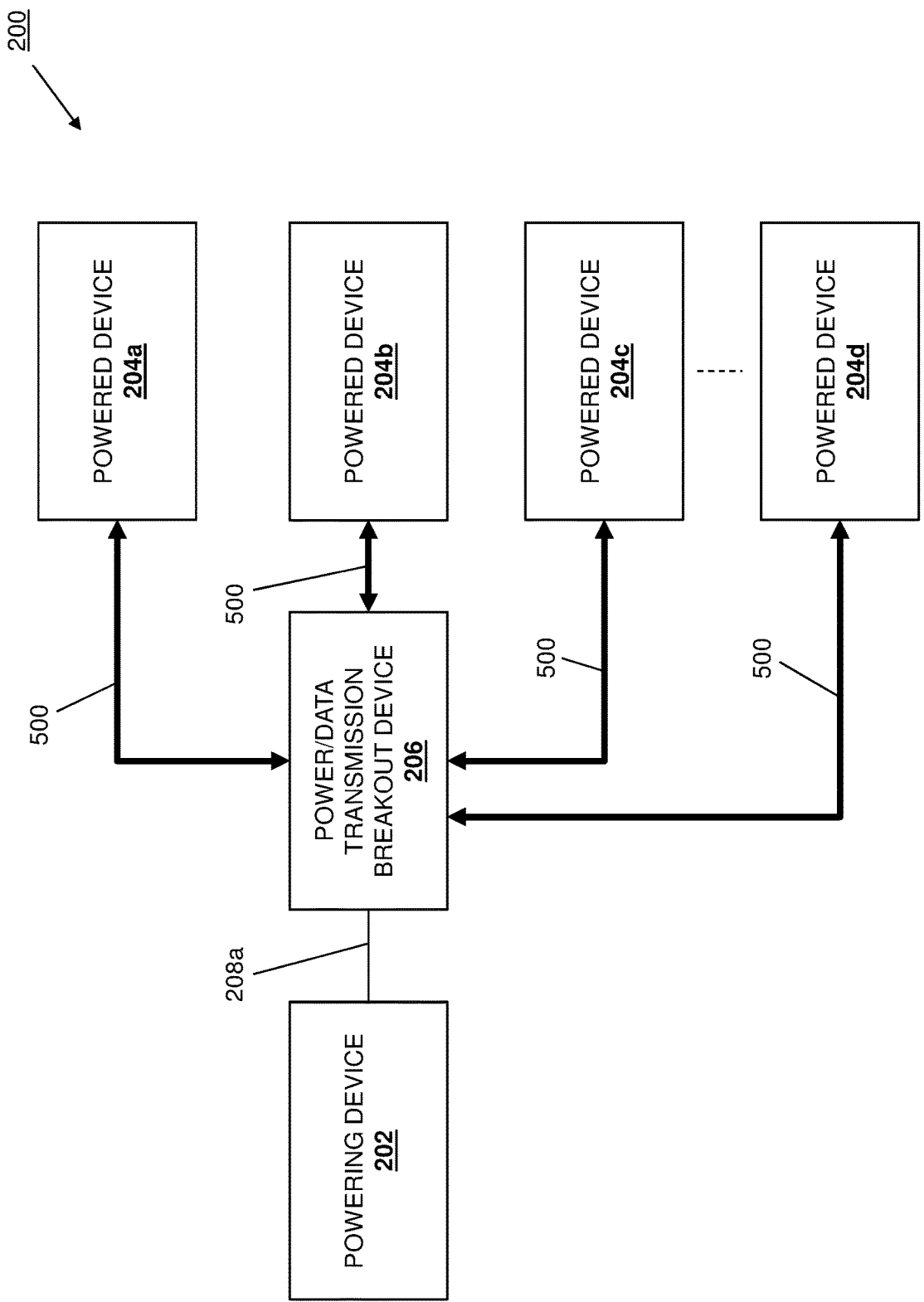
FIG. 5A is a schematic view illustrating an embodiment of the power/data transmission breakout system of FIG. 2 operating during the method of FIG. 4.
Figure 5B:
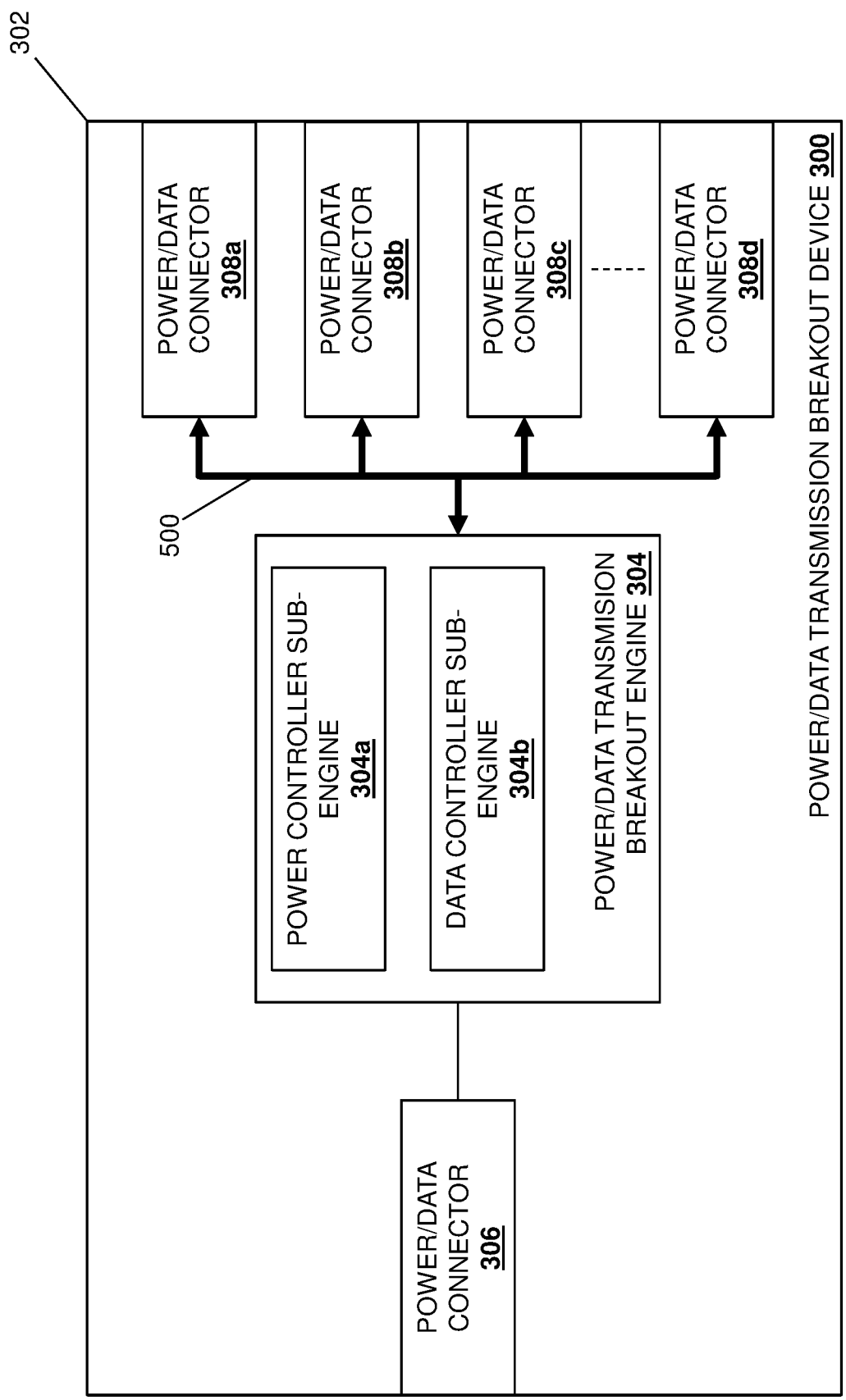
FIG. 5B is a schematic view illustrating an embodiment of the power/data transmission breakout system of FIG. 2 operating during the method of FIG. 4.

The method 400 begins at block 402 where a power/data transmission breakout device identifies power requirements and data destination information for connected powered devices. With reference to FIGS. 5A and 5B, in an embodiment of block 402, the power/data transmission breakout engine 304 in the power/data transmission breakout device 206/300 may operate to perform power requirement/data destination information retrieval operations 500 with each of the powered devices 204a-204d (e.g., via each of the power/data cables 208b-208e) in order to retrieve power requirements and data destination information from those powered devices 204a-204d. For example, at block 402, the power/data transmission breakout engine 304 in the power/data transmission breakout device 206/300 may perform any of a variety of power requirement identification techniques (e.g., PoE power requirement identification techniques) with each of the powered devices 204a-204d as part of the power requirement/data destination information retrieval operations 500 in order to identify power requirements for each of the powered devices 204a-204d.

As will be appreciated by one of skill in the art in possession of the present disclosure, in some embodiments of block 402, the power/data transmission breakout engine 304 in the power/data transmission breakout device 206/300 may identify actual power requirements for each of the powered devices 204a-204d, which allows different power requirements to be identified for one or more of the powered devices 204a-204d, thus ensuring that power may only be provided to each of the powered devices 204a-204d in an amount that is required by that powered device for operation. As will be appreciated by one of skill in the art in possession of the present disclosure, any of the powered devices 204a-204d may perform negotiations with the power/data transmission breakout engine 304 in the power/data transmission breakout device 206/300 in order to determine how much power will be provided by the power/data transmission device 206/300 to that powered device. As such, while the power/data transmission breakout device 206/300 is discussed below as requesting power from the powering device 202 subsequent to determining the power requirements for the powered devices 204a-204d, in some embodiments the power/data transmission breakout device 206/300 may identify the maximum power available from the powering device 202 (e.g., e.g., via the power/data cable 208a), and then perform negotiations based on that maximum power that is available.

However, in other embodiments of block 402, the power/data transmission breakout engine 304 in the power/data transmission breakout device 206/300 may simply identify a number of the powered devices 204a-204d, which allows for the equal distribution of power received from the powering device 202 to each of the powered devices 204a-204d. However, while two specific examples have been provided, one of skill in the art in possession of the present disclosure will recognize that power requirements for the powered devices 204a-204d may be determined in a variety of manners (e.g., the power/data transmission breakout engine 304 in the power/data transmission breakout device 206/300 may identify types of the powered device 204a-204d and use those types to estimate their corresponding power requirements, etc.) that will fall within the scope of the present disclosure as well.

In another example, at block 402, the power/data transmission breakout engine 304 in the power/data transmission breakout device 206/300 may perform any of a variety of data destination information identification techniques (e.g., Media Access Control (MAC) address identification techniques) with each of the powered devices 204a-204d as part of the power requirement/data destination information retrieval operations 500 in order to identify data destination information for each of the powered devices 204a-204d. As such, one of skill in the art in possession of the present disclosure will recognize that the power/data transmission breakout engine 304 in the power/data transmission breakout device 206/300 may identify any of a variety of data destination information for each of the powered devices 204a-204d that allow for the forwarding of data received from the powering device 202 to the powered device that is the destination for that data.

Figure 6A:
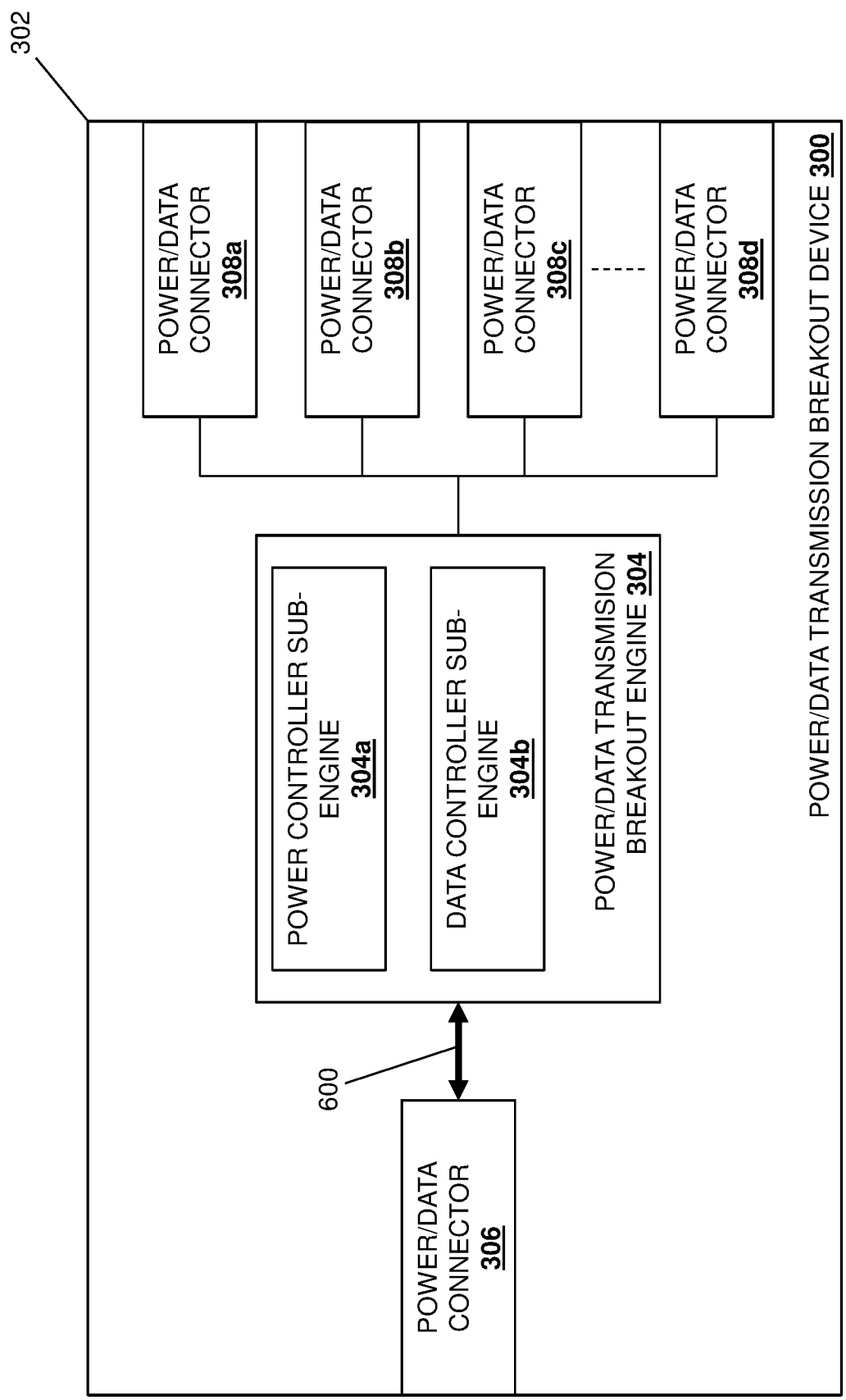
FIG. 6A is a schematic view illustrating an embodiment of the power/data transmission breakout device of FIG. 3 operating during the method of FIG. 4.
Figure 6B:
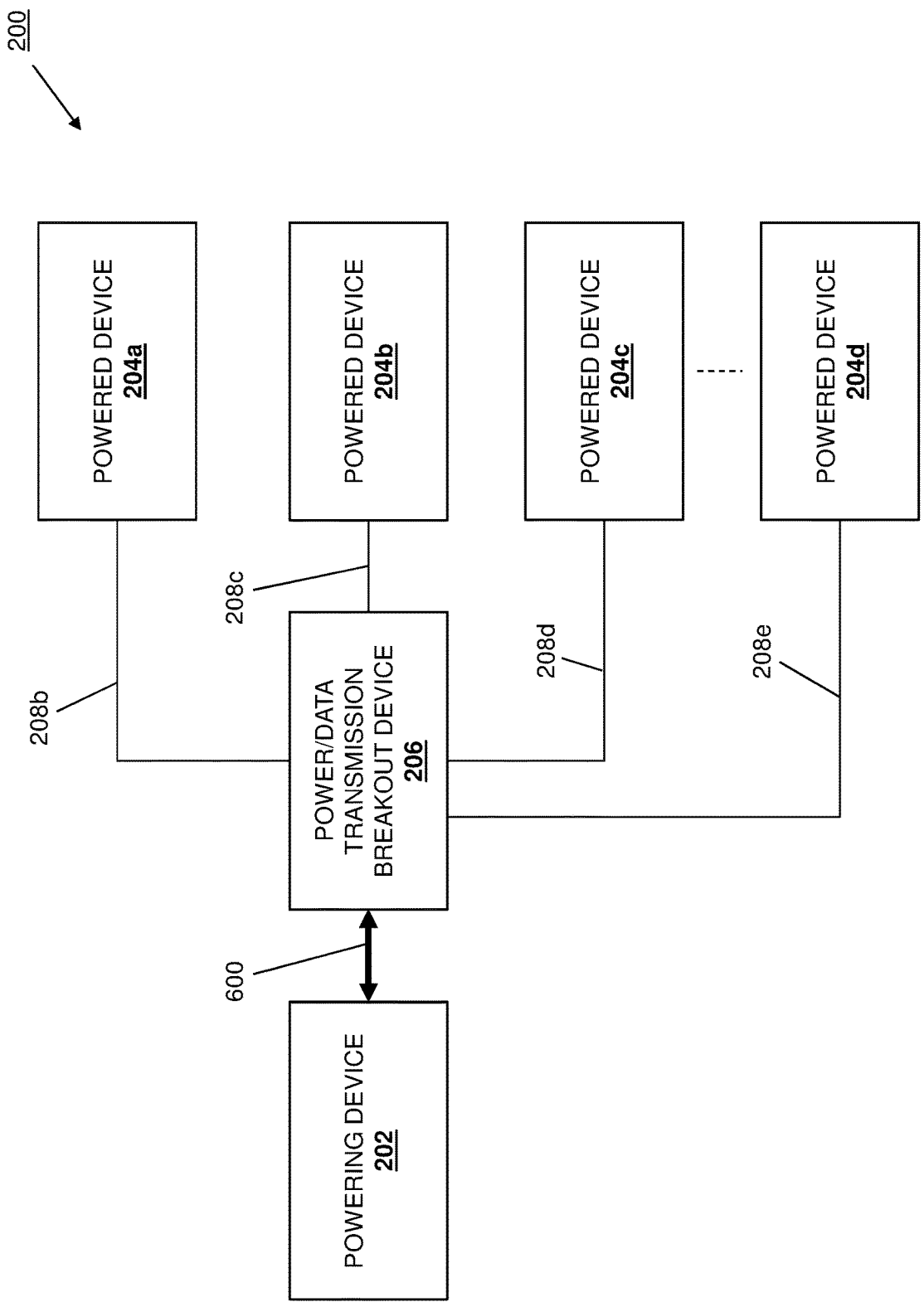
FIG. 6B is a schematic view illustrating an embodiment of the power/data transmission breakout system of FIG. 2 operating during the method of FIG. 4.

The method 400 then proceeds to block 404 where the power/data transmission breakout device transmits data destination information and a power request to a connected powering device. With reference to FIGS. 6A and 6B, in an embodiment of block 404, the power/data transmission breakout engine 304 in the power/data transmission breakout device 206/300 may operate to perform data destination information/power request transmission operations 600 with the powering device 202 (e.g., via the power/data cable 208a) in order to transmit data destination information for the power/data transmission breakout device 206/300 and a power request to the powering device 202. For example, at block 402, the power/data transmission breakout engine 304 in the power/data transmission breakout device 206/300 may perform any of a variety of power request techniques (e.g., PoE power request techniques) with the powering device 202 as part of the data destination information/power request transmission operations 600 in order to request power from the powering device 202.

As will be appreciated by one of skill in the art in possession of the present disclosure, in some embodiments of block 404, the power request transmitted by the power/data transmission breakout engine 304 in the power/data transmission breakout device 206/300 as part of the data destination information/power request transmission operations 600 may identify a power amount that is based on the actual power requirements for each of the powered devices 204a-204d identified at block 402 (e.g., the power amount may be equal to the sum of the individual power requirements for the powered devices 204a-204d). As will be appreciated by one of skill in the art in possession of the present disclosure, the power/data transmission breakout engine 304 in the power/data transmission breakout device 206/300 may perform negotiations with the powering device 202 in order to determine how much power will be provided by the powering device 202 to the power/data transmission device 206/300.

However, in other embodiments of block 402, the power request transmitted by the power/data transmission breakout engine 304 in the power/data transmission breakout device 206/300 as part of the data destination information/power request transmission operations 600 may simply request the maximum amount of power available from the powering device (e.g., 60 watts) via the power/data cable 208a and power/data connector on the powering device 202 (e.g., for equal distribution of 15 watts to each of the powered devices 204a-204d). However, while two specific examples have been provided, one of skill in the art in possession of the present disclosure will recognize that the amount of power requested at block 404 may be determined in a variety of manners (e.g., the power/data transmission breakout engine 304 in the power/data transmission breakout device 206/300 may request a power amount that is based on estimated power requirements for the types of the powered device 204a-204d, etc.) that will fall within the scope of the present disclosure as well.

In another example, at block 404, the power/data transmission breakout engine 304 in the power/data transmission breakout device 206/300 may perform any of a variety of data destination information transmittal techniques (e.g., Media Access Control (MAC) address transmittal techniques) with the powering device 202 as part of the data destination information/power request transmission operations 600 in order to transmit data destination information for the power/data transmission breakout device 206. One of skill in the art in possession of the present disclosure will recognize that the power/data transmission breakout engine 304 in the power/data transmission breakout device 206/300 may identify its data destination information to the powering device in order to allow for the forwarding of data by the powering device 202 to the power/data transmission breakout device 206.

As such, one of skill in the art in possession of the present disclosure will recognize that, in some embodiments, the powering device 202 may be configured to forward any data destined for the powered devices 204a-204d using data destination information (e.g., a MAC address) for the power/data transmission breakout device 206, with the power/data transmission breakout engine 304 in the power/data transmission breakout device 206/300 configured to then forward that data to the powered device 204a that is the destination of that data. Thus, any data provided to the powering device 202 and destined for one of the powered devices 204a-204d may include data destination information that allows the powering device to forward that data to the power/data transmission breakout device 206, as well as data destination information that allows the power/data transmission breakout device 206 to forward that data to the powering device that is the destination for that data. In a specific example, the forwarding of data from the powering device to a powered device may be performed utilizing IP masquerading techniques that operate to hide an Internet Protocol (IP) address space (i.e., including IP addresses of the powered devices 204a-204d) behind a single IP address (e.g., the IP address of the power/data transmission breakout device 206). As such, one of skill in the art in possession of the present disclosure will recognize that the power/data transmission breakout device 206 may change the IP address of any of the powered devices 204a-204d that was provided as a source address in a data transmission to the IP address of the power/data transmission breakout device 206 such that the data transmission appears to originate from the power/data transmission breakout device 206.

Thus, following block 404 of the method 400, the powering device 202 may be configured to provide power to the power/data transmission breakout device 206 in an amount that is sufficient to power the powered devices 204a-204d, while also forwarding any data destined for one of the powered devices 204a-204d to the power/data transmission breakout device 206. Furthermore, following block 404 of the method 400, the power/data transmission breakout device 206 may be configured to distribute power received from the powering device 202 to each of the powered devices 204a-204d (e.g., in amounts required by those powered devices 204a-204d, in equal amounts, in amounts estimated for those powered devices 204a-204d, etc.), and forward data received from the powering device 202 to the powered device that is the destination for that data. However, while specific techniques for enabling power and data provisioning by the powering device 202, and power and data distribution by the power/data transmission breakout device 206, have been described, one of skill in the art in possession of the present disclosure will appreciate that the powering device 202 and the power/data transmission breakout device 206 may be configured using a variety of techniques to enable the functionality described below while remaining within the scope of the present disclosure as well.

Figure 7A:
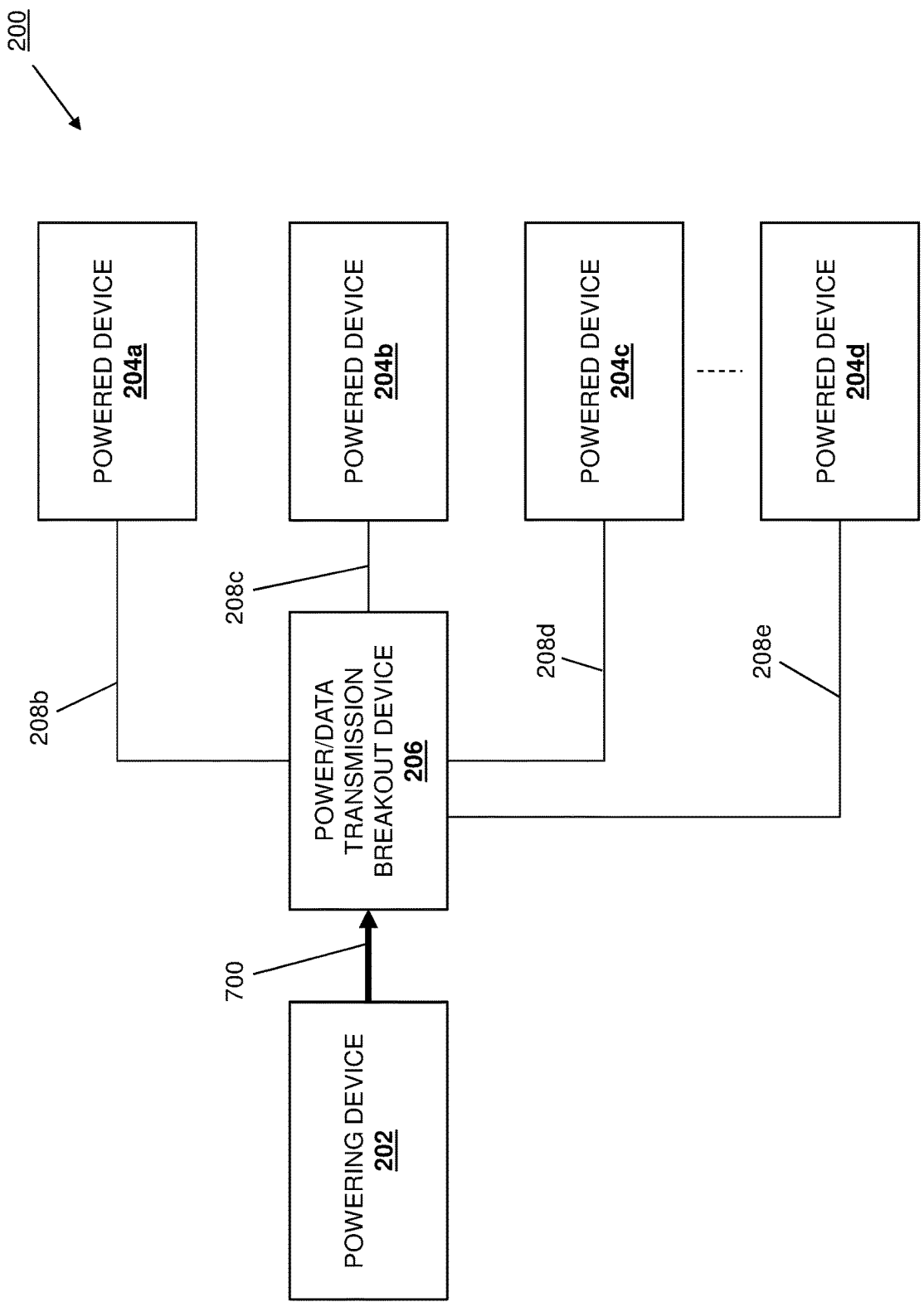
FIG. 7A is a schematic view illustrating an embodiment of the power/data transmission breakout system of FIG. 2 operating during the method of FIG. 4.
Figure 7B:
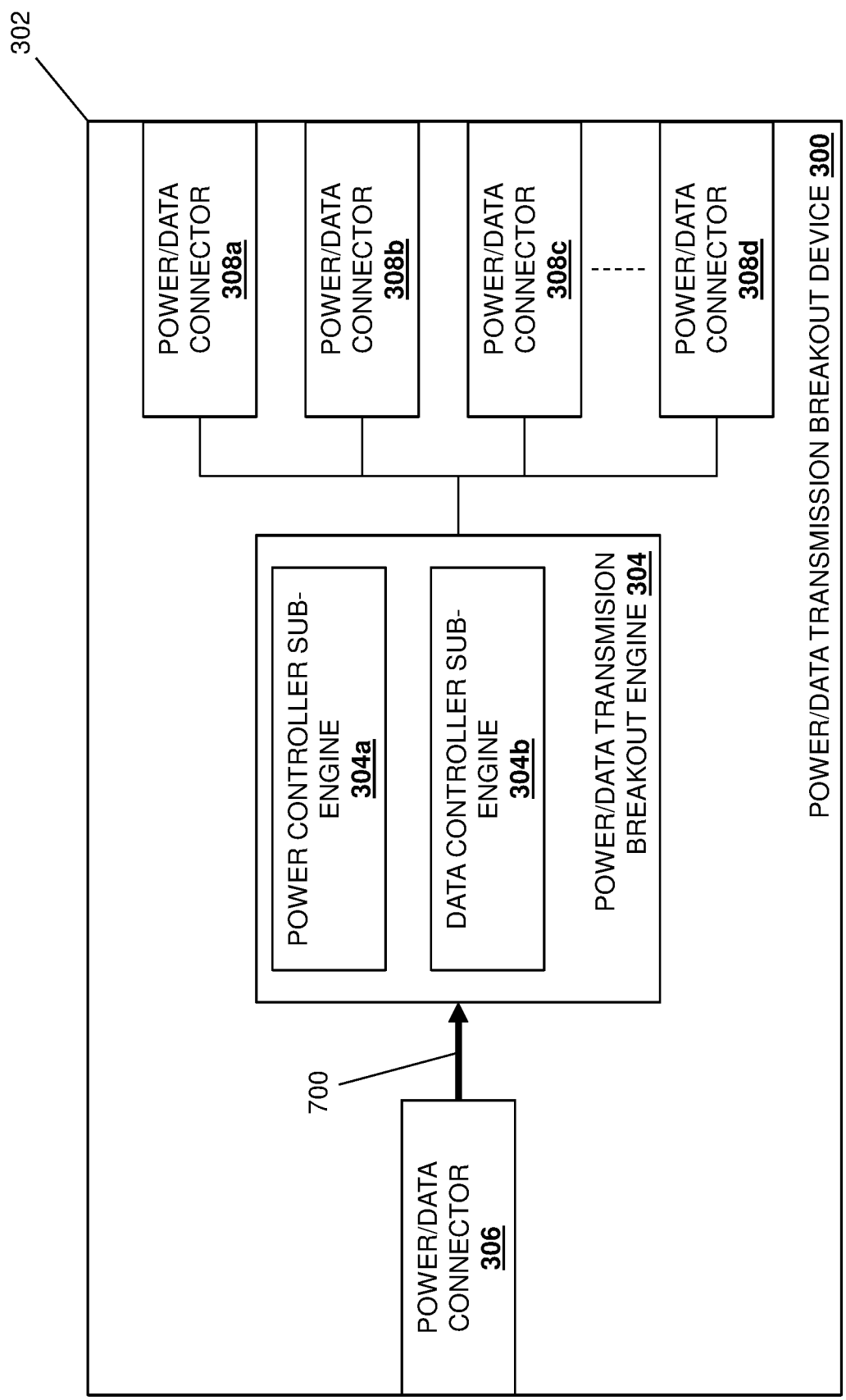
FIG. 7B is a schematic view illustrating an embodiment of the power/data transmission breakout device of FIG. 3 operating during the method of FIG. 4.

The method 400 then proceeds to block 406 where the power/data transmission breakout device receives power and data from the powering device. Referring now to FIGS. 7A and 7B, in an embodiment of block 406, the powering device 202 may perform power/data transmission operations 700 in order to transit power and data via the power/data cable 208a to the power/data connector 306 on the power/data transmission breakout device 206/300. As will be appreciated by one of skill in the art in possession of the present disclosure, the powering device may be coupled to a power source (e.g., via an AC power cable coupled to an AC wall outlet and a power system in the powering device 202), and may transmit power received from that power source as part of the power/data transmission operations 700 at block 406, and in an amount corresponding to the power request received from the power/data transmission breakout device 206/300 at block 404. Furthermore, the powering device 202 may also receive data and transmit that data along with the power as part of the power/data transmission operations 700 at block 406, and as discussed above may utilize data destination information provided with that data to determine that the data should be transmitted to the power/data transmission breakout device 206/300. Thus, at block 406, the power/data transmission breakout engine 304 in the power/data transmission device 206/300 may receive the power and data transmitted by the powering device 202 via the power/data connector 306 connected to the power/data cable 208a.

The method 400 then proceeds to block 408 where the power/data transmission breakout device identifies a first powered device as a destination for the data received from the powering device. In an embodiment, at block 408, the power/data transmission breakout engine 304 in the power/data transmission breakout device 206/300 may operate to identify the powering device 204b as a destination of the data received from the powering device 202 at block 406. As will be appreciated by one of skill in the art in possession of the present disclosure, the power/data transmission breakout engine 304 in the power/data transmission breakout device 206/300 may use the data destination information identified for each of the powered devices 204a-204d at block 402, and data destination information provided with the data received from the powering device 202, in order to identify that the powered device 204b is the destination for that data. However, while a specific example is provided, one of skill in the art in possession of the present disclosure will recognize that the identification of powered devices that are the destination for data received from a powering device may be performed in a variety of manners that will fall within the scope of the present disclosure as well.

Figure 7C:
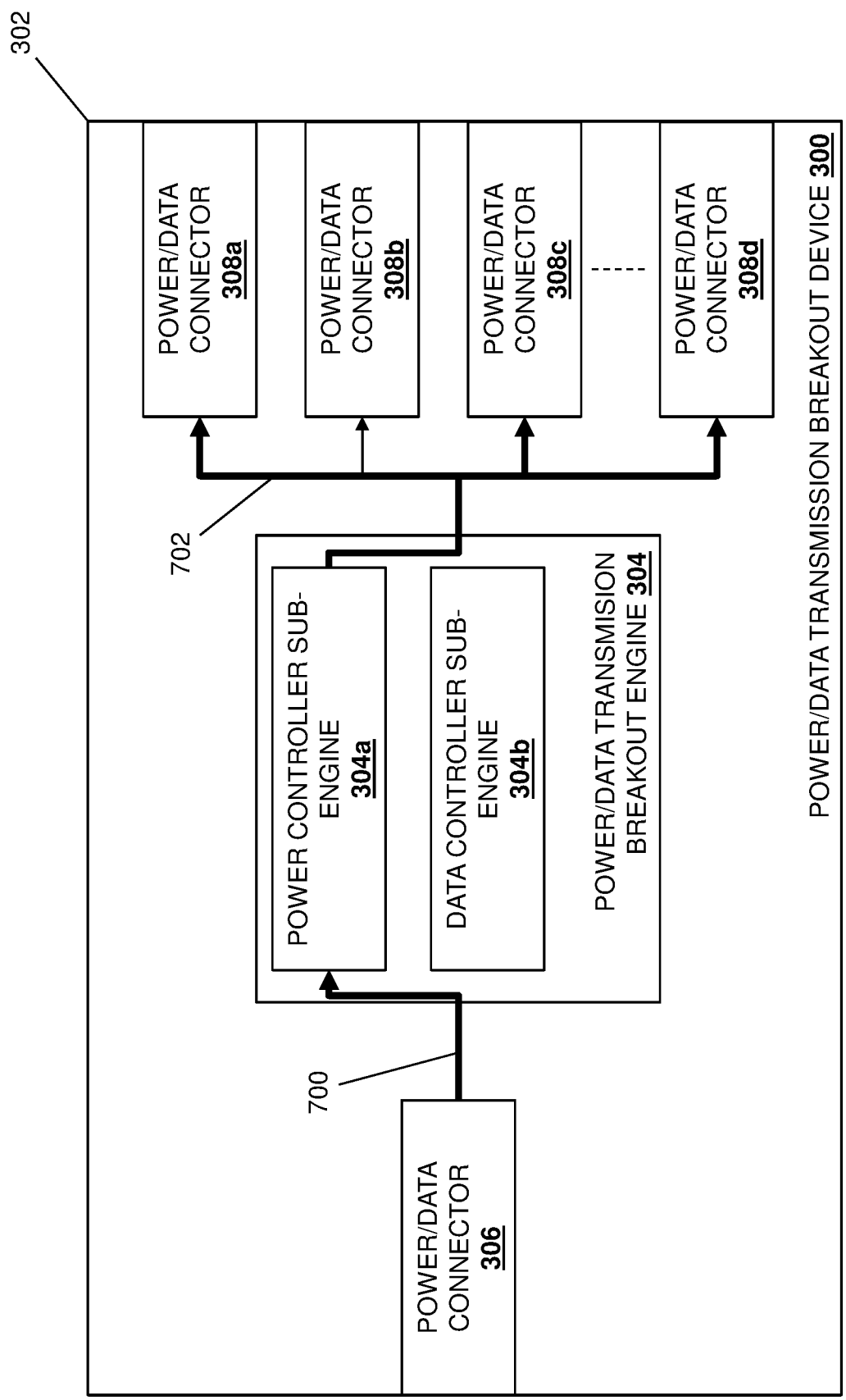
FIG. 7C is a schematic view illustrating an embodiment of the power/data transmission breakout device of FIG. 3 operating during the method of FIG. 4.

The method 400 then proceeds to block 410 where the power/data transmission breakout device transmits a subset of the power received from the powering device to each powered device. With reference to FIGS. 7C and 7D, in an embodiment of block 410, the power controller sub-engine 304a in the power/data transmission breakout engine 304 in the power/data transmission breakout device 206/300 may receive the power transmitted as part of the power/data transmission operations 700, and may then perform power distribution operations 702 that include the transmission of subsets of the power received as part of the power/data transmission operations 700 via the power/data connectors 308a, 308c, and 308d and over their connected power/data cables 208b, 208d, and 208e, respectively, to the respective powered devices 204a, 204c, and 204d connected to those power/data cables.

As discussed above, the subsets of power transmitted by the power/data transmission breakout device 206/300 to the powered devices 204a, 204c, and 204d may be based on the specific power requirements for each of those powered devices 204a, 204c, and 204d identified at block 402, and thus the subset/amount of power transmitted to any of the powered devices 204a, 204c, and 204d may be different than the subset/amount of power transmitted to any of the other powered devices 204a-204d (although two or more powered devices with the same power requirements that cause the same subset/amount of power to be transmitted to those powered devices will fall within the scope of the present disclosure as well). As also discussed above, the power transmitted by the power/data transmission breakout device 206/300 to the powered devices 204a, 204c, and 204d may be an equal distribution of the power received from the powering device 212 to each of the powered devices 204a-204d identified at block 402, and thus the subset/amount of power transmitted to any of the powered devices 204a, 204c, and 204d may be the same as the subset/amount of power transmitted to any of the other powered devices 204a-204d. However, as discussed above, other power subset transmission techniques (e.g., power subsets/amounts transmitted based on the types of powered devices identified at block 402) will fall within the scope of the present disclosure as well.

Figure 7E:
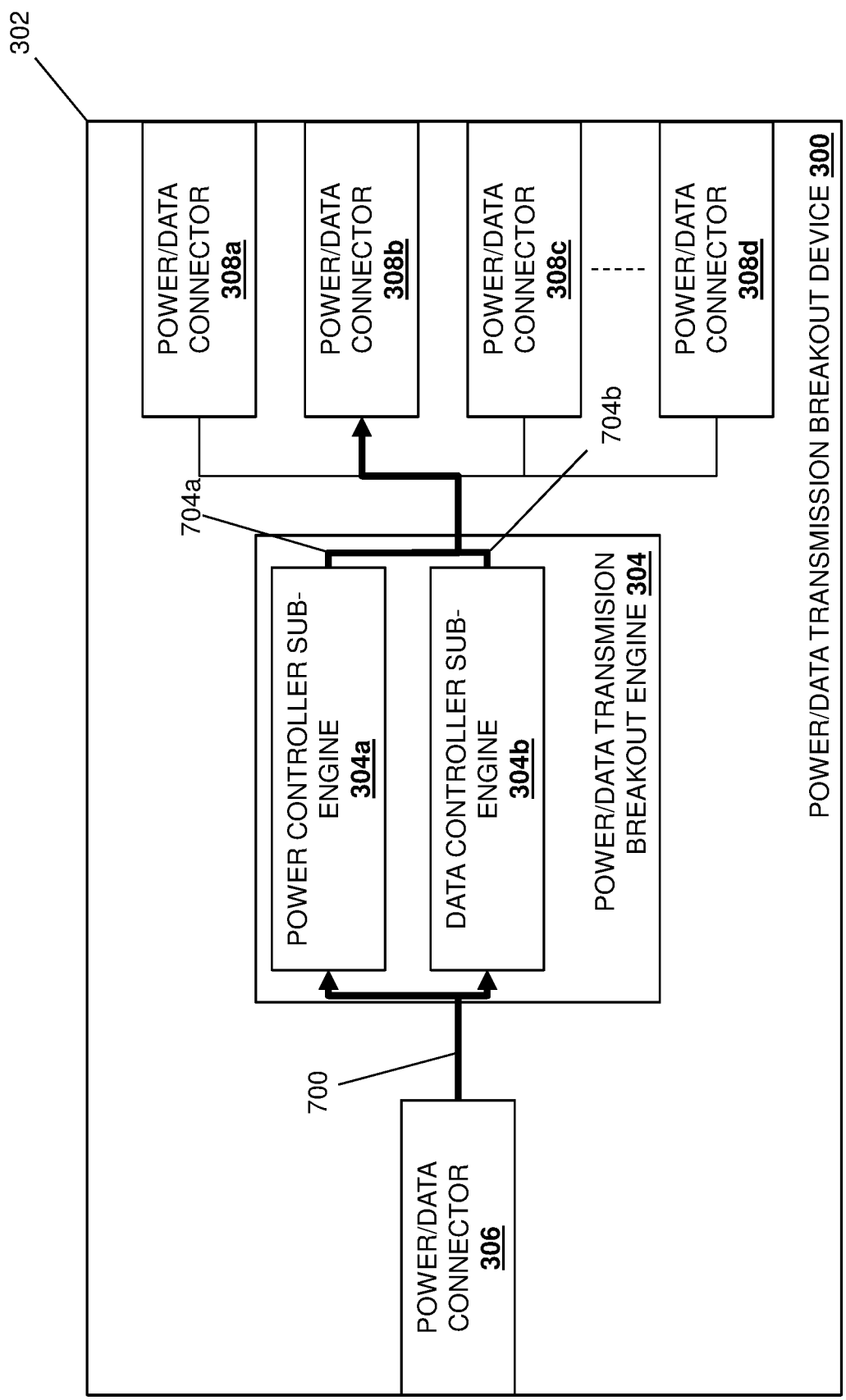
FIG. 7E is a schematic view illustrating an embodiment of the power/data transmission breakout device of FIG. 3 operating during the method of FIG. 4.
Figure 7F:
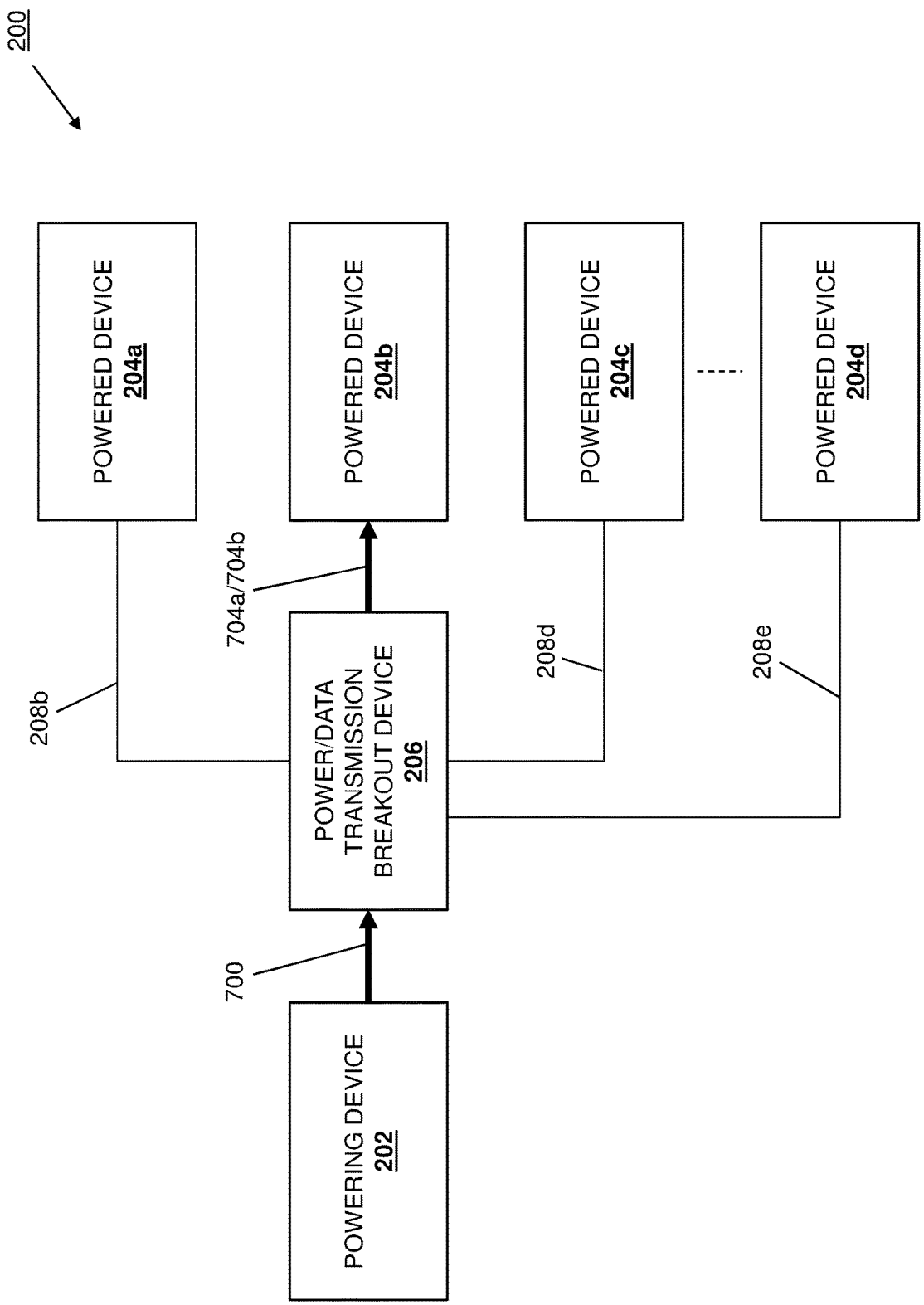
FIG. 7F is a schematic view illustrating an embodiment of the power/data transmission breakout system of FIG. 2 operating during the method of FIG. 4.

The method 400 then proceeds to block 412 where the power/data transmission breakout device transmits the data received from the powering device along with the subset of the power received from the powering device to the first powered device. With reference to FIGS. 7E and 7F, in an embodiment of block 412, the power controller sub-engine 304a in the power/data transmission breakout engine 304 in the power/data transmission breakout device 206/300 may receive the power transmitted as part of the power/data transmission operations 700 as discussed above, while the data controller sub-engine 304b in the power/data transmission breakout engine 304 in the power/data transmission breakout device 206/300 may receive the data transmitted as part of the power/data transmission operations 700. The power controller sub-engine 304a in the power/data transmission breakout engine 304 in the power/data transmission breakout device 206/300 may then perform power distribution operations 704a that include the transmission of a subset of the power received as part of the power/data transmission operations 700 via the power/data connector 308b and over its connected power/data cable 208c to the powered device 204b, while the data controller sub-engine 304b in the power/data transmission breakout engine 304 in the power/data transmission breakout device 206/300 may then perform data distribution operations 704b that include the transmission of the data received as part of the power/data transmission operations 700 via the power/data connector 308b and over its connected power/data cable 208c to the powered device 204b (i.e., based on the identification of the powered device 204b as the destination of that data).

As discussed above, the subset of power transmitted by the power/data transmission breakout device 206/300 to the powered device 204b may be based on the specific power requirements for the powered device 204b identified at block 402, and thus the subset/amount of power transmitted to the powered device 204b may be different than the subset/amount of power transmitted to any of the other powered devices 204a-204d (although two or more powered devices with the same power requirements that cause the same subset/amount of power to be transmitted to those powered devices will fall within the scope of the present disclosure as well). As also discussed above, the power transmitted by the power/data transmission breakout device 206/300 to the powered device 204b may be an equal distribution of the power received from the powering device 212 to each of the powered devices 204a-204d identified at block 402, and thus the subset/amount of power transmitted to the powered device 204b may be the same as the subset/amount of power transmitted to any of the other powered devices 204a-204d. However, as discussed above, other power subset transmission techniques (e.g., power subsets/amounts transmitted based on the types of powered devices identified at block 402) will fall within the scope of the present disclosure as well.

As will be appreciated by one of skill in the art in possession of the present disclosure, while the transmission of the subsets of power to the powered devices 204a, 204c, and 204d are illustrated in FIGS. 7C and 7D as separate from the transmission of the subset of power and the data to the powered device 204b, those operations may be performed at the same (or substantially the same time). Thus, power received from the powering device 202 may be distributed by the power/data transmission breakout device 206 to each of the powered devices 204a, 204b, 204c, and 204d at the same time, with data received from the powering device 202 and identified as destined for the powered device 204b may be transmitted by the power/data transmission device 206 along with the subset of power to the powered device 204b. Furthermore, while data is only described as being transmitted to the powered device 204b, one of skill in the art in possession of the present disclosure will recognize that the powering device 202 may receive and forward data destined for any of the powered device 204a-204d, and thus data may be transmitted along with power by the power/data transmission breakout device 206 to any of the powered devices 204a-204d in substantially the same manner as described above for the powered device 204b. As will be appreciated by one of skill in the art in possession of the present disclosure, each of the powered devices 204a-204d may utilize the subsets of power received from the power/data transmission breakout device 206 to operate, and any powered device 204a-204d receiving data may utilize that data in its operation as well.

Furthermore, one of skill in the art in possession of the present disclosure will appreciate how any of the powered devices 204a-204d may transmit data via their respective power/data cables 208b-208e to the power/data transmission breakout device 206, and the data transmission sub-engine 304b in the power/data transmission breakout engine 304 may then operate to forward that data to the powering device 202 for transmission via a network to its destination. As such, data may be exchanged between the powering device 202 and any of the powered devices 204a-204d, with power provided by the powering device 202 to the power/data transmission breakout device 206 via the single power/data cable 208a, and that power distributed via each respective single power cable 208b-208e to the powered devices 204a-204d, respectively, via the power/data transmission breakout device 206.

Thus, systems and methods have been described that provide for the distribution of power and data, which are received via a single power/data cable from the switch device, to a plurality of different computing devices. For example, the power/data transmission breakout system includes a power/data transmission breakout device that is coupled to a switch device and each of a plurality of computing devices, with the power/data transmission breakout device receiving power and data from the switch device via a first power/data cable that is connected to the power/data transmission breakout device, and identifying a first computing device that is included in the plurality of computing devices as a destination for the data that was received from the switch device. The power/data transmission breakout device then transmits a respective subset of the power that was received from the switch device via each of a plurality of second power/data cables that are each connected to the power/data transmission breakout device and a respective one of the plurality of computing devices, and transmits the data that was received from the switch device along with the respective subset of the power that was received form the switch device via the second power/data cable that is connected to the first computing device. As such, a single power/data cable connection to a single power/data connector on a switch device to be utilized in the provisioning of power and data to multiple computing devices, thus allowing the switch device to provide power and data to many more computing devices relative to conventional single-cable power/data transmission systems, and reducing the amount of power/data cabling required to do so (e.g., a single power/data cable may be connected to a single power/data connector on the switch device, and run to a location where it may be connected to the power/data transmission breakout device and used to provide power and data to multiple computing devices.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power/data transmission breakout system, comprising:
   a powering device;
   a plurality of powered devices; and
   a power/data transmission breakout device that is coupled to the powering device and each of the plurality of powered devices, wherein the power/data transmission breakout device is configured to:
   communicate with each of the plurality of powered devices to determine powering requirements for each of the plurality of powered devices;
   communicate, subsequent to determining the powering requirements for each of the plurality of powered devices, with the powering device to request a power amount that is based on the sum of the powering requirements for each of the plurality of powered devices;
   receive, from the powering device, power and data via a first power/data cable that is connected to the power/data transmission breakout device;
   identify a first powered device that is included in the plurality of powered devices as a destination for the data that was received from the powering device;
   transmit a respective subset of the power that was received from the powering device via each of a plurality of second power/data cables that are each connected to the power/data transmission breakout device and a respective one of the plurality of powered devices, wherein the subset of power transmitted to each respective one of the plurality of powered devices is based on that powering requirements of that powered device; and
   transmit the data that was received from the powering device along with the respective subset of the power that was received from the powering device via the second power/data cable that is connected to the first powered device.

2. The system of claim 1, wherein the first power/data cable and each of the plurality of second power/data cables are each provided by a respective Ethernet cable.

3. The system of claim 1, wherein the first power/data cable and the each of the plurality of second power/data cables are each provided by a respective hybrid fiber optic/copper cable.

4. The system of claim 1, wherein the communications with the powering device to request the power amount that is based on the sum of the powering requirements for each of the plurality of powered devices includes Power over Ethernet (PoE) negotiation communications.

5. The system of claim 1, wherein the power/data transmission breakout device is configured to:
   communicate with each of the plurality of powered devices to determine respective data destination information for each of the plurality of powered devices, wherein the first powered device is identified as the destination for the data that was received from the powering device using the respective data destination information determined for the first powered device.

6. The system of claim 5, wherein the power/data transmission breakout device is configured to:
   identify, to the powering device, second data destination information for the power/data transmission breakout device that is configured for use by the powering device in transmitting the data via the first power/data cable.

7. An Information Handling System (IHS), comprising:
   a processing system; and
   a memory system that is coupled to the processing system and that includes instructions that, when executed by the processing system, cause the processing system to provide a power/data transmission breakout engine that is configured to:
   communicate with each of a plurality of powered devices to determine powering requirements for each of the plurality of powered devices;
   communicate, subsequent to determining the powering requirements for each of the plurality of powered devices, with a powering device to request a power amount that is based on the sum of the powering requirements for each of the plurality of powered devices;
   receive, from the powering device, power and data via a first power/data cable that is coupled to the processing system;
   identify a first powered device that is included in the plurality of powered devices as a destination for the data that was received from the powering device;
   transmit a respective subset of the power that was received from the powering device via each of a plurality of second power/data cables that are each coupled to the processing system and a respective one of the plurality of powered devices, wherein the subset of power transmitted to each respective one of the plurality of powered devices is based on that powering requirements of that powered device; and transmit the data that was received from the powering device along with the respective subset of the power that was received from the powering device via the second power/data cable that is connected to the first powered device.

8. The IHS of claim 7, wherein the first power/data cable and each of the plurality of second power/data cables are each provided by a respective Ethernet cable.

9. The IHS of claim 7, wherein the first power/data cable and the each of the plurality of second power/data cables are each provided by a respective hybrid fiber optic/copper cable.

10. The IHS of claim 7, wherein the communications with the powering device to request the power amount that is based on the sum of the powering requirements for each of the plurality of powered devices includes Power over Ethernet (PoE) negotiation communications.

11. The IHS of claim 7, wherein the power/data transmission breakout engine is configured to:

communicate with each of the plurality of powered devices to determine respective data destination information for each of the plurality of powered devices, wherein the first powered device is identified as the destination for the data that was received from the first powering device using the respective data destination information determined for the first powered device.

12. The IHS of claim 11, wherein the power/data transmission breakout engine is configured to:

identify, to the powering device, second data destination information that is configured for use by the powering device in transmitting the data via the first power/data cable.

13. The IHS of claim 7, wherein each respective subset of the power that is transmitted via each of the plurality of second power/data cables to the respective one of the plurality of powered devices includes a substantially equal portion of the power that was received from the powering device.

14. A method for transmitting power and data, comprising:

communicating, by a power/data transmission breakout device, with each of the plurality of powered devices to determine powering requirements for each of the plurality of powered devices;

communicating, by the power/data transmission breakout device subsequent to determining the powering requirements for each of the plurality of powered devices, with a powering device to request a power amount that is based on the sum of the powering requirements for each of the plurality of powered devices;

receiving, by the power/data transmission breakout device from the powering device, power and data via a first power/data cable that is connected to the power/data transmission breakout device;

identifying, by the power/data transmission breakout device, a first powered device that is included in a plurality of powered devices as a destination for the data that was received from the powering device;

transmitting, by the power/data transmission breakout device, a respective subset of the power that was received from the powering device via each of a plurality of second power/data cables that are each connected to the power/data transmission breakout device and a respective one of the plurality of powered devices, wherein the subset of power transmitted to each respective one of the plurality of powered devices is based on that powering requirements of that powered device; and transmitting, by the power/data transmission breakout device, the data that was received from the powering device along with the respective subset of the power that was received from the powering device via the second power/data cable that is connected to the first powered device.

15. The method of claim 14, wherein the first power/data cable and each of the plurality of second power/data cables are each provided by a respective Ethernet cable.

16. The method of claim 14, wherein the first power/data cable and the each of the plurality of second power/data cables are each provided by a respective hybrid fiber optic/copper cable.

17. The method of claim 14, wherein the communications with the powering device to request the power amount that is based on the sum of the powering requirements for each of the plurality of powered devices includes Power over Ethernet (PoE) negotiation communications.

18. The method of claim 14, further comprising:

communicating, by the power/data transmission breakout device, with each of the plurality of powered devices to determine respective data destination information for each of the plurality of powered devices, wherein the first powered device is identified as the destination for the data that was received from the first powering device using the respective data destination information determined for the first powered device.

19. The method of claim 18, further comprising:

identifying, by the power/data transmission breakout device to the powering device, second data destination information for the power/data transmission breakout device that is configured for use by the powering device in transmitting the data via the first power/data cable.

20. The method of claim 14, wherein each respective subset of the power that is transmitted via each of the plurality of second power/data cables to the respective one of the plurality of powered devices includes a substantially equal portion of the power that was received from the powering device.

* * * * *